(12) United States Patent
Kim

(10) Patent No.: US 9,718,448 B2
(45) Date of Patent: Aug. 1, 2017

(54) PEDAL SIMULATOR

(71) Applicant: MANDO CORPORATION, Gyeonggi-do (KR)

(72) Inventor: Hyun-Dong Kim, Incheon (KR)

(73) Assignee: MANDO CORPORATION, Gyeonggi-Do (KR)

( * ) Notice: Subject to any disclaimer, the term of this patent is extended or adjusted under 35 U.S.C. 154(b) by 0 days.

(21) Appl. No.: 14/924,401

(22) Filed: Oct. 27, 2015

(65) Prior Publication Data

US 2016/0114769 A1 Apr. 28, 2016

(30) Foreign Application Priority Data

Oct. 28, 2014 (KR) .................. 10-2014-0147064

(51) Int. Cl.
*B60T 13/74* (2006.01)
*B60T 7/04* (2006.01)
*B60T 8/40* (2006.01)

(52) U.S. Cl.
CPC .............. *B60T 7/042* (2013.01); *B60T 8/409* (2013.01)

(58) Field of Classification Search
CPC ........ B60T 7/042; B60T 8/409; B60T 8/4086; B60T 8/4077; B60T 8/4081
USPC ...................... 303/3, 10, 113.1, 113.4, 114.1
See application file for complete search history.

(56) References Cited

U.S. PATENT DOCUMENTS

| | | | | |
|---|---|---|---|---|
| 5,312,172 A * | 5/1994 | Takeuchi | ................ | B60T 7/042 303/113.1 |
| 6,139,119 A * | 10/2000 | Otomo | .................. | B60T 8/3655 303/113.1 |
| 2008/0284242 A1* | 11/2008 | Ganzel | ...................... | B60T 7/12 303/114.1 |
| 2011/0006594 A1* | 1/2011 | Ganzel | .................. | B60T 8/4077 303/10 |
| 2014/0131154 A1* | 5/2014 | Ganzel | .................. | B60T 8/4081 188/355 |

* cited by examiner

*Primary Examiner* — Pamela Rodriguez
(74) *Attorney, Agent, or Firm* — McDermott Will & Emery LLP

(57) ABSTRACT

A pedal simulator of the present invention is disclosed. According to an aspect of the present invention, the pedal simulator, which is connected with a master cylinder and receives pedal pressure of the driver and configured to provide a sense of a pedal for a driver, includes: a simulation chamber having one end connected with the master cylinder and the other end provided in the simulator block closed by a damping housing, and configured to store oil; a check valve pressurized by the piston, provided in the simulation chamber to be slideable, and slid; an orifice formed in the simulator block and allowing a flow of oil in the simulation chamber by the sliding check valve; and an accumulator configured to store the oil discharged through the orifice.

10 Claims, 4 Drawing Sheets

−PRIOR ART−

PEDAL SIMULATOR

CROSS-REFERENCE TO RELATED APPLICATION

This application claims the benefit of Korean Patent Application No. 10-2014-0147064, filed on Oct. 28, 2014 in the Korean Intellectual Property Office, the disclosure of which is incorporated herein by reference.

BACKGROUND

1. Field

The present invention relates to a pedal simulator, and more specifically, to a pedal simulator capable of increasing a sense of a pedal.

2. Description of the Related Art

In general, a brake system for braking is necessarily mounted in a vehicle. Recently, a system for electronically controlling braking hydraulic pressure transferred toward wheel cylinders mounted on wheels to obtain a more powerful and stable braking force has been proposed. As an example of the electronic brake system, an anti-lock brake system (ABS), a brake traction control system (BTCS), or an electronic stability control system (ESC), etc. has been proposed.

The electronic brake system provides a sense of the pedal by having a separate hydraulic pedal sensation simulating device (hereafter, referred as a pedal simulator) installed to provide a sense of the pedal for a driver at the time of braking. At this time, the pedal simulator, which is designed to provide reaction force similar to that of the pedal simulator of a conventional brake system (CBS), has been used.

In FIG. 1, a conventional pedal simulator is shown.

Referring to FIG. 1, the pedal simulator 10 provides a sense of the pedal by including: a simulator block 11 having a simulation chamber 12 which is connected with a master cylinder 1 and into which hydraulic pressure, generated according to the pedal pressure of a brake pedal 2, is introduced; two pistons 21 and 22 provided in the simulation chamber 12; and two springs 23 and 24 and two rubber dampers 25 and 26. Also, oil stored in the simulation chamber 12 is connected through a flow path 13 connected with a reservoir 3, so the oil pressurized according to movement of the pistons 21 and 22 is introduced into the reservoir 3. At this time, a simulation valve 30 is installed in the flow path 13 to control the flow of oil between the reservoir 3 and the simulation chamber 12. That is, the conventional pedal simulator 10 provides a sense of the pedal using the springs 23 and 24 and the rubber dampers 25 and 26.

However, since the pedal simulator 10 achieves a sense of the pedal only using the springs 23 and 24 and the rubber dampers 25 and 26, a difference between pedal pressure of the brake pedal 2 and the reaction force at the time of releasing of the pedal pressure is hardly generated, and thus there is a problem of providing a unfamiliar sense of braking for a driver.

Also, the plurality of springs 23 and 24 and the plurality of rubber dampers 25 and 26 are needed to provide a sense of the pedal, and also the simulation valve 30 should be separately provided, and thus there are problems of having a complicated configuration and increasing costs.

The pedal simulator according to an embodiment of the present invention is configured as a closed circuit between the simulation chamber and the accumulator, and can adjust pedal pressure of the brake pedal and a sense of the pedal at the time of releasing the pedal pressure by providing a sense of the pedal through the flow path resistance of the orifice.

SUMMARY

According to an aspect of the present invention, a pedal simulator, which is connected with a master cylinder and configured to provide a sense of a pedal for a driver by receiving hydraulic pressure according to pedal pressure of a driver, may include: a simulation chamber which has one end connected with the master cylinder and the other end provided in a simulator block closed by a damping housing, and is configured to store oil; a check valve which is pressurized by a piston, provided in the simulation chamber to be slideable, and is slid; an orifice formed in the simulator block and allowing flow of oil in the simulation chamber by the sliding check valve; and an accumulator configured to store oil discharged through the orifice.

Also, the pedal simulator may further include a return spring provided between the check valve and the damping housing and returning the check valve to its original position.

Also, the simulation chamber and the accumulator connected through the orifice may be configured as a closed circuit.

Also, the orifice may be formed by selectively changing a size and number thereof depending on a required pedal pressure Also, the orifice may be formed below the maximum movement range of the check valve to prevent the orifice from being blocked by the check valve pressurized by the piston.

Also, a stopper, which is in contact with the piston, may be provided at an upper end of the check valve, and the stopper is formed of a rubber material.

Also, a stopper for limiting a movement distance of the check valve may be provided in the damping housing, and the stopper is formed of a rubber material.

Also, the check valve may include a valve body for sealing between the simulation chamber and the piston and sliding in the simulation chamber; and a ball member for closing a flow path formed to penetrate the valve body, wherein the ball member is configured to block the flow path when pressure is generated in the simulation chamber.

Also, the damping housing may include an escape preventing protrusion protruding toward the flow path of the check valve to prevent the ball member from escaping from the flow path.

Also, a fixing member may be further installed at a lower end of the damping housing to fix the damping housing to the simulation block.

BRIEF DESCRIPTION OF THE DRAWINGS

The present invention will be described in detail by the below drawings, but the drawings illustrate a preferable embodiment of the present invention. Therefore, the technical scope of the present invention should not be construed as limited to the drawings.

These and/or other aspects of the invention will become apparent and more readily appreciated from the following description of the embodiments, taken in conjunction with the accompanying drawings of which.

DETAILED DESCRIPTION

Hereinafter, embodiments of the present invention will be described in detail with reference to the accompanying drawings. The embodiments set forth hereinafter are proposed to sufficiently explain the technical ideas or spirit of the present invention to those having ordinary knowledge in the related art to which the present invention pertains. In the accompanying drawings, portions unrelated to the description will be omitted in order to clearly describe the present invention, and a size of component may be exaggerated in order to assist in understanding of the present invention.

Figure 1:
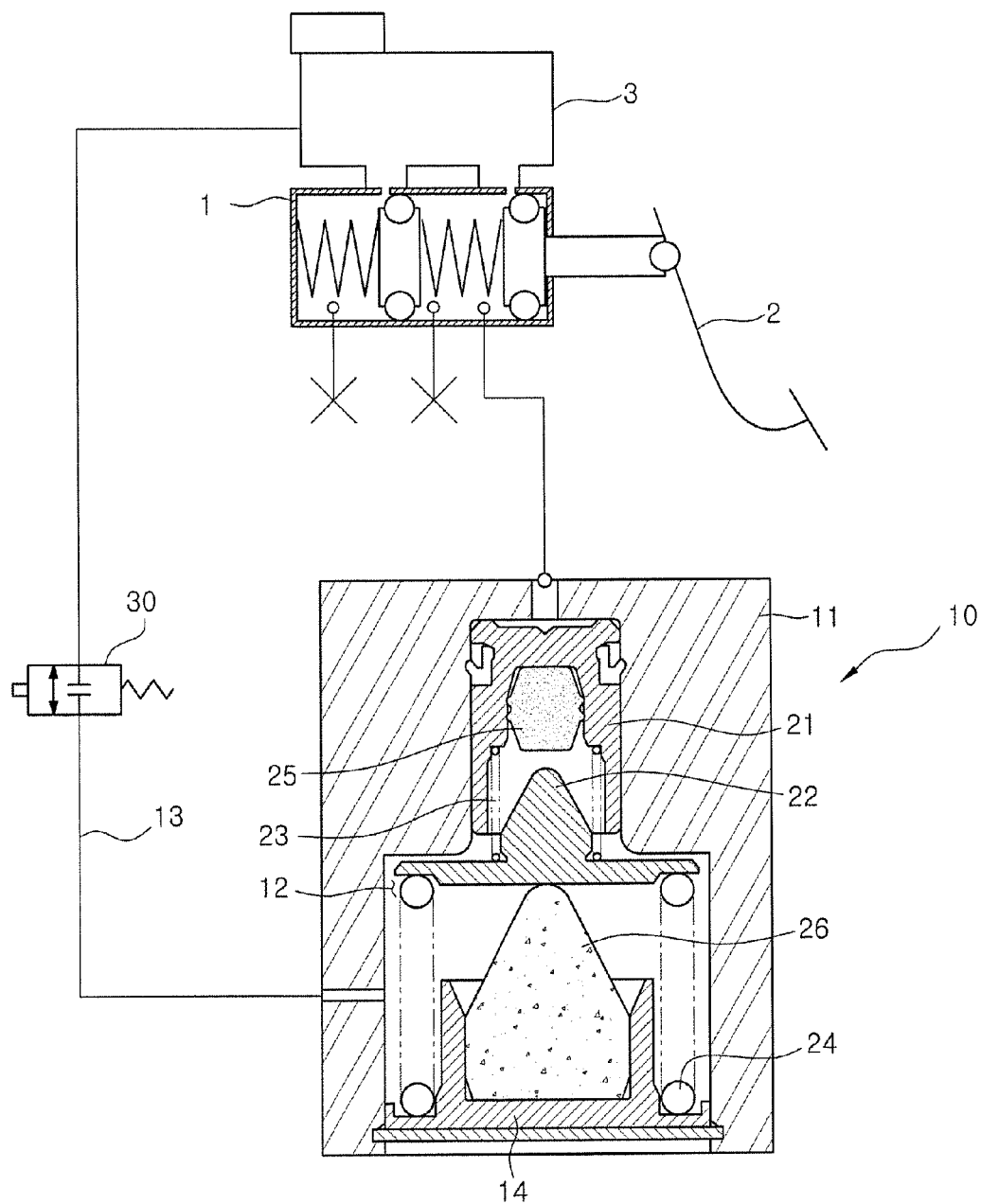
FIG. 1 is a drawing schematically illustrating a conventional pedal simulator.
Figure 2:
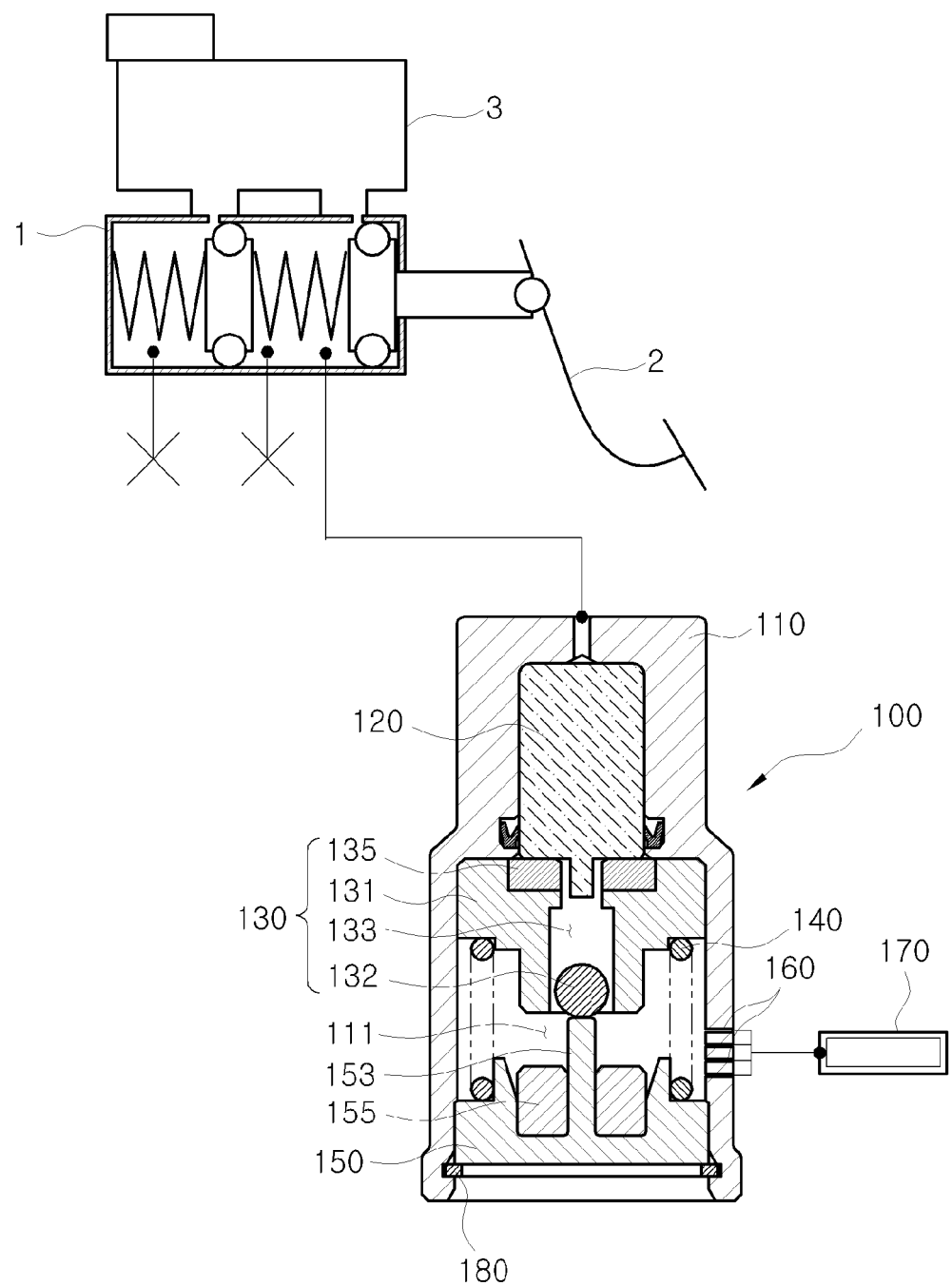
FIG. 2 is a drawing showing a pedal simulator according to a preferable embodiment of the present invention.

FIG. 2 is a drawing showing a pedal simulator according to a preferable embodiment of the present invention.

Referring to FIG. 2, the pedal simulator 100 according to an embodiment of the present invention includes: a simulator block 110 including a simulation chamber 111 which is connected with a master cylinder 1 and into which hydraulic pressure is introduced by the pedal pressure of the brake pedal 2; a piston 120 provided on the simulation chamber 111 to be slideable; a check valve 130 pressurized by the piston 120; a return spring 140 for elastically supporting the check valve 130; a damping housing 150 for sealing the simulator block 110; an orifice 160 formed in the simulator block 110; and an accumulator 170 in communication with the simulation chamber 111 through the orifice 160.

The simulator block 110 is connected so that hydraulic pressure is introduced from a master cylinder 1 from an upper part, and has the simulation chamber 111 having an open lower part. The lower part of the simulator block 110 is closed by the damping housing 150. The piston 120, the check valve 130, the return spring 140, and the damping housing 150 are provided in the simulator block 110 in order in a serial structure. Here, the orifice 160 is formed in a radial direction of a lower side of the simulator block 110, the structure of which will be described below again. Meanwhile, oil is stored in the simulation chamber 111.

The piston 120 is provided in the simulation chamber 111 to be slideable, and is pressurized and moved by the hydraulic pressure introduced from the master cylinder 1.

The check valve 130 is provided in the simulation chamber 111 to be slideable in a state of being in contact with the piston 120, and is pressurized by moving the piston 120. More specifically, the check valve 130 includes a valve body 131 sliding in the simulation chamber 111 and a ball member 132 for closing a flow path 133 formed to penetrate the valve body 131.

The valve body 131 is provided to seal between the simulation chamber 111 and the piston 120. That is, an outer surface of the valve body 131 is provided to be in a state of contact with an inner surface of the simulator block 110, and is slid and moved. An upper surface of the valve body 131 is provided to be in contact with the piston 120. The flow path 133 penetrated in a movement direction of the check valve 130 and stepped is provided in the center of the valve body 131.

The ball member 132 for opening and closing the flow path 133 is configured to block the flow path 133 when pressure is generated in the simulation chamber 111. For example, the ball member 132, as shown in FIG. 2, is provided in a state of opening the flow path 133. When the hydraulic pressure is generated, that is, when the hydraulic pressure is introduced from the master cylinder 1 to pressurize the piston 120 and the check valve 130, pressure is generated in the simulation chamber 111, and thus, as shown in FIG. 2, the ball member 132 blocks the flow path 133. At this time, the ball member 132 is supported by an escape preventing protrusion 153 of the damping housing 150 to be described below to prevent the ball member 132 from escaping from the flow path 133 of the check valve 130.

Meanwhile, the check valve 130 further includes a stopper 135. The stopper 135 is provided at an upper end of the valve body 131, and is installed to be in contact with the piston 120. The stopper 135 is formed of a rubber material to absorb a shock when pressurized by the piston 120. That is, the stopper 135 is provided to minimize a sense of heterogeneity generated when the metal piston 120 and the valve body 131 are directly bumped into each other.

The return spring 140 is provided so that the check valve 130, pressurized by the piston 120 according to a brake operation and is moved, returns to its original position at the time of releasing braking. The return spring 140 is provided in the simulation chamber 111 to elastically support the check valve 130. That is, the return spring 140 is arranged between the damping housing 150 and the check valve 130, and one end of the return spring 140 is supported on the valve body 131 and the other end is supported on the damping housing 150.

The damping housing 150 is coupled to be spaced apart a predetermined distance from the check valve 130 to close a lower end of the simulator block 110, and supports the return spring 140. The damping housing 150 has a stopper 155. The stopper 155 is supported on the damping housing 150, and limits a movement distance of the check valve 130 by coming in contact with the check valve 130 when the check valve 130 is moved. Also, the stopper 155 is formed of a rubber material to absorb a shock when coming in contact with the check valve 130. That is, the stopper 155 is provided to minimize a sense of heterogeneity generated when the metal check valve 130 and the damping housing 150 are directly bumped into each other.

Also, the damping housing 150 includes the escape preventing protrusion 153. The escape preventing protrusion 153, as described above, prevents the ball member 132 of the check valve 130 from escaping from the flow path 133. Therefore, the escape preventing protrusion 153 is formed to protrude toward the flow path 133 of the check valve 130.

Meanwhile, a fixing member 180 is further installed at a lower end of the damping housing 150 so that the damping housing 150 is stably fixed to the simulator block 110. At this time, the fixing member 180, provided as a circlip, and the like, is fixed to the simulator block 110 to support the damping housing 150.

When the check valve 130 is pressurized by the piston 120, pressure is applied to the oil stored in the simulation chamber 111. Therefore, the orifice 160 is formed in the simulator block 110 and provides pedal pressure by allowing the flow of oil. The orifice 160 is formed in a side surface adjacent to a lower side of the simulator block 110 to prevent the orifice from being blocked by the check valve 130 when the check valve 130 is pressurized and moved. Therefore, the orifice 160 is formed to be positioned below the maximum movement range of the check valve 130.

The orifice 160 may be formed in a plural number. That is, the orifice 160 may be formed by selectively changing a size or number thereof depending on the required pedal pressure. For example, when the number and size of the orifices 160 are increased, a sense of a smooth pedal may be provided. When the number and size of the orifices 160 are decreased, a sense of a stiff pedal may be provided.

According to an embodiment of the present invention, the pedal simulator 100 is configured as a closed circuit by including the accumulator 170. That is, the accumulator 170 is connected with the simulation chamber 111 through the orifice 160. Since the simulation chamber 111 is blocked from the master cylinder 1 by the check valve 130, the closed circuit is configured in the pedal simulator 100. The accumulator 170, which stores a predetermined amount of oil, preferably stores an amount of oil as much as a volume of the piston 120 pressurized by the hydraulic pressure. At this time, although not shown, the accumulator 170 includes a chamber therein, and may store the oil discharged through the orifice 160 by providing a piston and a spring or damper in the chamber.

Then, an operation state of the pedal simulator will be described with reference to FIGS. 2 to 4.

Firstly, the pedal simulator 100 shown in FIG. 2 is in a state of braking not being performed. When the pedal simulator 100 is in a state of braking not being performed, the ball member 132 of the check valve 130 is supported by the escape preventing protrusion 153 of the damping housing 150.

Figure 3:
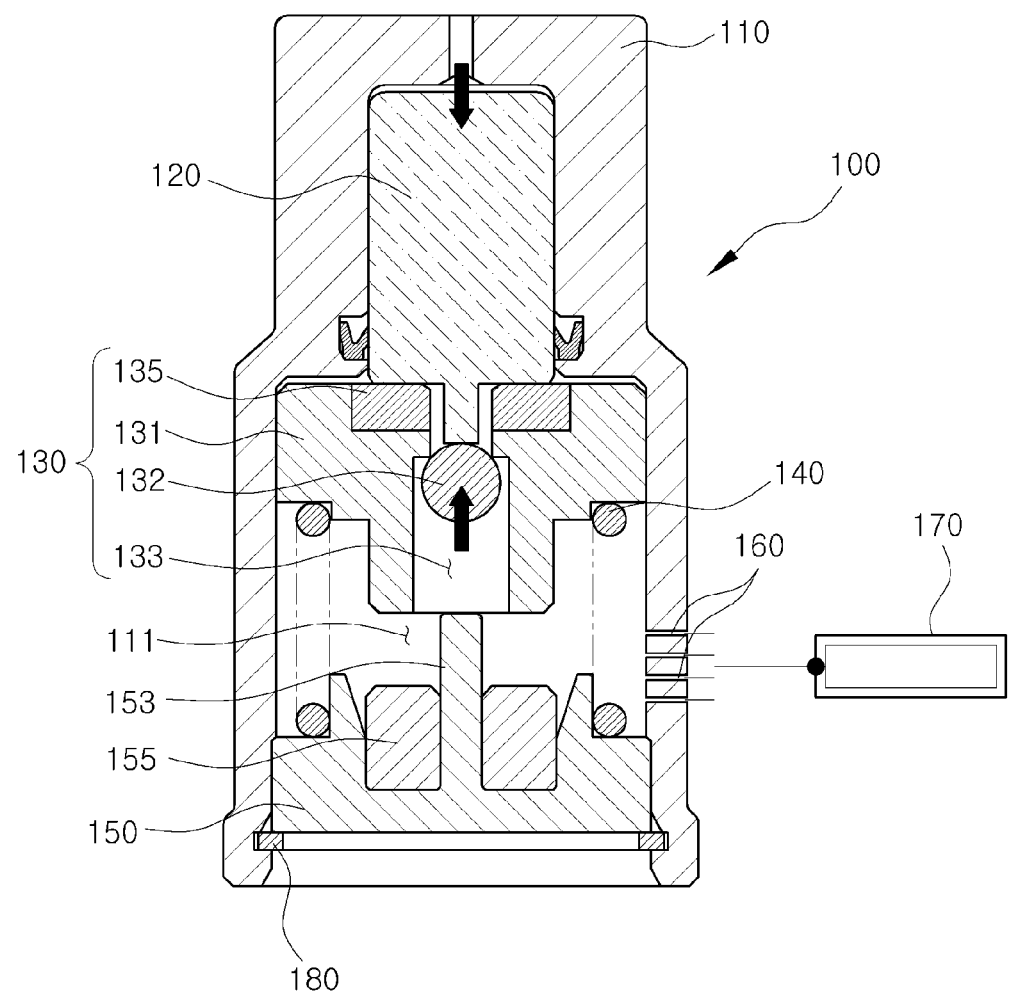
FIGS. 3 and 4 are drawings each illustrating operation states of the pedal simulator according to the preferable embodiment of the present invention.

Next, when the hydraulic pressure is introduced into the simulation chamber 111 through the simulator block 110 from the master cylinder 1 by a driver stepping on the brake pedal 2, as shown in FIG. 3, the piston 120 is slid to pressurize the check valve 130. At this time, the simulation chamber 111 is pressurized by the check valve 130 to generate pressure, so the ball member 132 blocks the flow path 133 of the check valve 130.

Meanwhile, the stopper 135, formed of a rubber material, is provided at an upper end of the check valve 130, pressurized by the piston 120, to be in contact with the piston 120, and thus, a sense of heterogeneity transmitted to the driver may be minimized when the piston 120 pressurizes the check valve 130.

Figure 4:
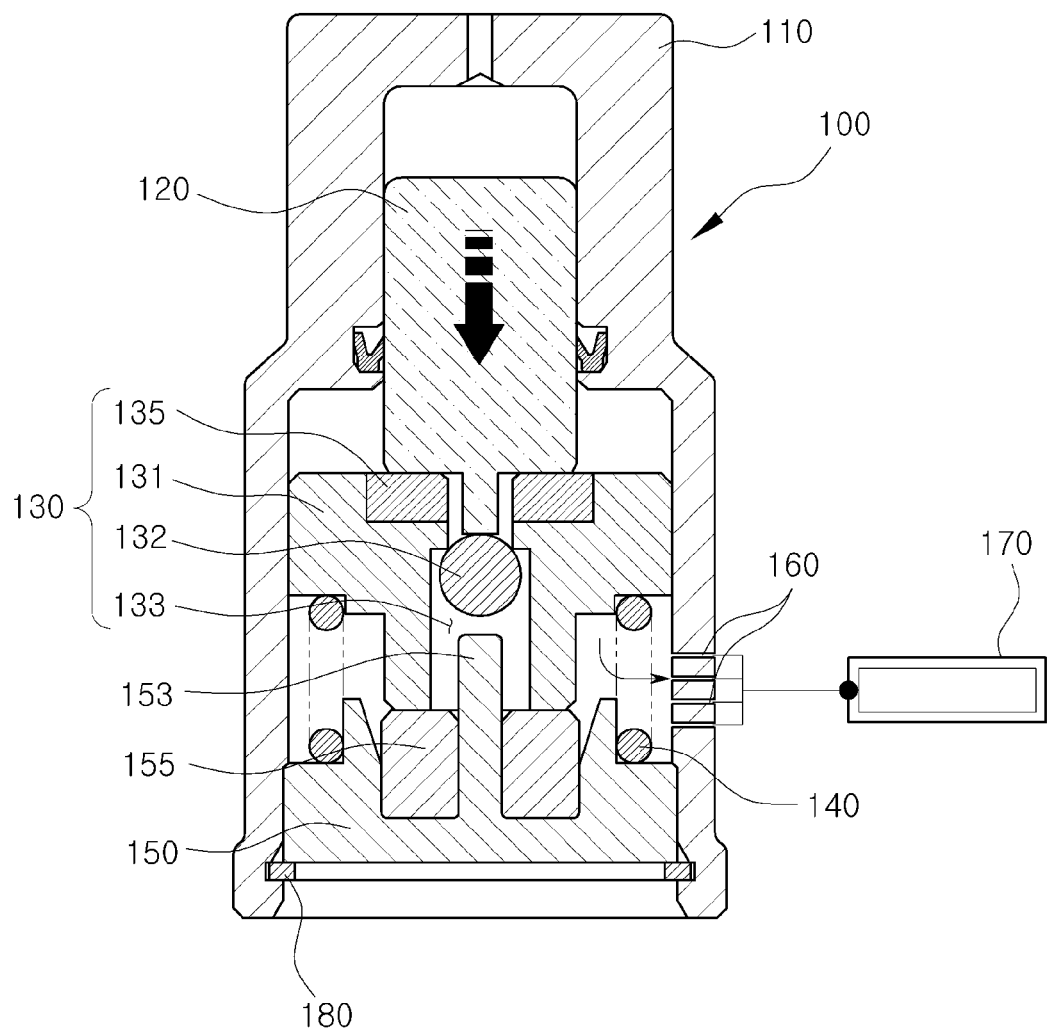

When the driver continuously steps on the brake pedal 2, as shown in FIG. 4, the piston 120 and the check valve 130 are moved while compressing the return spring 140. That is, the oil stored in the simulation chamber 111 is stored in the accumulator 170 through the orifice 160. At this time, the oil discharged through the orifice 160 generates a flow path resistance depending on a size and number of the orifices 160 to provide pedal pressure for the driver.

Also, the check valve 130 is limited in movement by the stopper 155 provided in the damping housing 150. Since the stopper 155 is formed of a rubber material, a sense of heterogeneity transmitted to the driver may be minimized when the check valve 130 and the stopper 155 are in contact with each other.

As described above, after braking is completed, when the pedal pressure of the brake pedal 2 is released, the piston in the master cylinder 1 is moved back (returns to its original position), and the hydraulic pressure introduced into the simulator block 110 is suctioned into the master cylinder 1. By an elastic restoring force of the return spring 140 and by allowing the oil compressed in the accumulator 170 to be introduced into the simulation chamber 111, the piston 120 and the check valve 130 may return to their original positions, and also smooth pedal pressure may be provided. At this time, a sense of the pedal may be adjusted at the time of releasing of pedal pressure of the brake pedal 2 by controlling an amount of compression and size of the accumulator 170.

Meanwhile, the pedal simulator 100 according to an embodiment of the present invention may constantly provide the same sense of the pedal for a driver by being configured as a closed circuit using the simulation chamber 111 and the accumulator 170. A sense of the pedal is provided through the oil stored in the simulation chamber 111, so a sense of the pedal similar to a sense of the pedal of the hydraulic brake may be provided.

The pedal simulator according to an embodiment of the present invention is formed by adjusting a size and number of orifices, thereby providing the pedal pressure of a brake pedal and repulsive force, generated when the pedal pressure is released, as a specification that a driver requires.

Also, the pedal simulator can control pedal pressure at the time of releasing the pedal pressure of the brake pedal by adjusting a size and compression amount of the accumulator, and can make a difference between a sense of the pedal according to pedal pressure of the brake pedal and a sense of the pedal at the time of releasing pedal pressure. That is, a sense of the pedal similar to a sense of the pedal of a hydraulic brake is provided at the time of braking, and, when braking is released, a smooth sense of the pedal is provided by oil suctioning into the master cylinder, an elastic restoring force of the return spring, and pressure of oil returned from the accumulator.

Meanwhile, since the pedal simulator is configured as a closed circuit between the simulation chamber and the accumulator, connection with a reservoir is not necessary, and a simulation valve may be omitted, thereby having a simple configuration and reducing costs.

As described above, although the present invention has been described with reference to exemplary embodiments and the accompanying drawings, it would be appreciated by those skilled in the art that the present invention is not limited thereto but various modifications and alterations might be made without departing from the scope defined in the claims and their equivalents.

What is claimed is:

1. A pedal simulator, which is connected with a master cylinder and configured to provide a sense of a pedal for a driver by receiving hydraulic pressure according to pedal pressure of the driver, comprising:
    a simulation chamber which has one end connected with the master cylinder and the other end provided in a simulator block closed by a damping housing, and is configured to store oil;
    a check valve which is pressurized by a piston, provided in the simulation chamber to be slideable, and is slid;
    an orifice formed in the simulator block and configured to allow a flow of oil in the simulation chamber by the sliding check valve; and
    an accumulator configured to store oil discharged through the orifice,
    wherein the check valve comprises a valve body configured to seal between the simulation chamber and the piston and slide in the simulation chamber; and a ball member which closes a flow path formed to penetrate the valve body,
    wherein the ball member is configured to block the flow path when pressure is generated in the simulation chamber.

2. The pedal simulator according to claim 1, further comprising a return spring provided between the check valve and the damping housing and configured to return the check valve to its original position.

3. The pedal simulator according to claim 1, wherein the simulation chamber and the accumulator connected through the orifice are configured as a closed circuit.

4. The pedal simulator according to claim 1, the orifice is formed by selectively changing a size and number thereof depending on a required pedal pressure.

5. The pedal simulator according to claim 1, wherein the orifice is formed below the maximum movement range of the check valve to prevent the orifice from being blocked by the check valve pressurized by the piston.

6. The pedal simulator according to claim 1, wherein a stopper, which is in contact with the piston, may be provided at an upper end of the check valve, and the stopper is formed of a rubber material.

7. The pedal simulator according to 1, wherein a stopper configured to limit a movement distance of the check valve is provided in the damping housing, and the stopper is formed of a rubber material.

8. The pedal simulator according to 1, wherein the damping housing comprises an escape preventing protrusion configured to protrude toward the flow path of the check valve to prevent the ball member from escaping from the flow path.

9. The pedal simulator according to claim 1, a fixing member is further installed at a lower end of the damping housing to fix the damping housing to the simulator block.

10. A pedal simulator, which is connected with a master cylinder and configured to provide a sense of a pedal for a driver by receiving hydraulic pressure according to pedal pressure of the driver, comprising:
  a simulation chamber which has one end connected with the master cylinder and the other end provided in a simulator block closed by a damping housing, and is configured to store oil;
  a check valve which is pressurized by a piston, provided in the simulation chamber to be slideable, and is slid;
  an orifice formed in the simulator block and configured to allow a flow of oil in the simulation chamber by the sliding check valve; and
  an accumulator configured to store oil discharged through the orifice,
  wherein the simulator block has a variable inner diameter in which an upper portion of the simulator block, into which the piston is fitted, has an inner diameter smaller than an inner diameter of a lower portion of the simulator block, and
  wherein the piston is a solid body and has a protrusion protruding from a bottom at a center of the piston into the check valve.

* * * * *